April 20, 1954 A. B. WALLER Re. 23,816

LOCK WASHER

Original Filed May 28, 1951 2 Sheets-Sheet 1

*INVENTOR.*

ARNE BERTIL WALLER

*BY*

A. Yates Dowell

ATTORNEY

LOCK WASHER

Original Filed May 28, 1951 2 Sheets-Sheet 2

INVENTOR.
ARNE BERTIL WALLER
BY
A. Yates Dowell
ATTORNEY

Reissued Apr. 20, 1954

Re. 23,816

UNITED STATES PATENT OFFICE 23,816

LOCK WASHER

Arne Bertil Waller, Stockholm, Sweden

Original No. 2,561,679, dated July 24, 1951, Serial No. 228,581, May 28, 1951. Application for reissue December 22, 1952, Serial No. 327,464

9 Claims. (Cl. 151—14)

Matter enclosed in heavy brackets [ ] appears in the original patent but forms no part of this reissue specification; matter printed in italics indicates the additions made by reissue.

This invention relates to lock washers and more particularly to lock washers especially designed for use in connection with bolts and nuts and related machine elements. The present application is a continuation-in-part of my co-pending application, Serial No. 136,723, now abandoned, filed January 4, 1950, for "Lock Washers," this latter application being a continuation-in-part of my co-pending application, Serial No. 722,671, filed January 17, 1947, for "Lock Washer."

It is a major purpose of the present invention to provide a lock washer which may be used with any type of nut and bolt, whether of standard or special construction, and which will function with maximum efficiency under all circumstances.

It is a further object of the present invention to provide a lock washer which will provide a substantially great degree of locking action without subjecting the nut and bolt in connection with which it is employed to any damage, such as thread deformation.

It is a further object of the present invention to provide a lock washer manufactured from a relatively soft and readily deformable material as distinguished from conventional washers manufactured from steel or spring material comparable in hardness to the bolt and nut in connection with which the washer is employed.

It is a still further object of the present invention to provide a lock washer which will function only once, the total locking effect thereof being lost or destroyed when the members in connection with which it has been employed are disassembled.

It is a still further object of the invention to provide a lock washer which may be readily adapted or positioned, which will provide a high degree of locking action, and which may be manufactured particularly economically.

Figure 1:
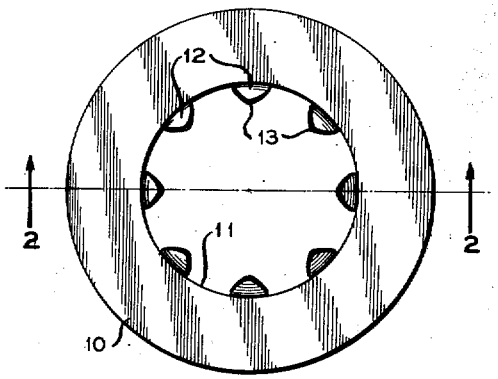
Figure 3:
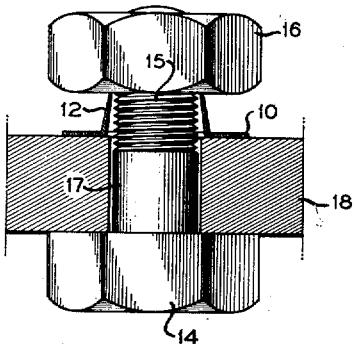
Figure 4:
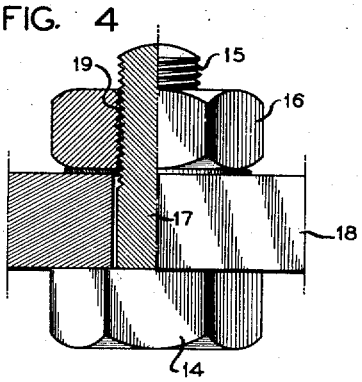
Figure 2:
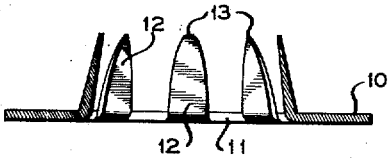
Figure 9:
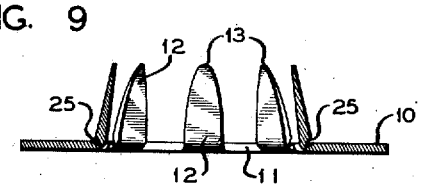
Figure 10:
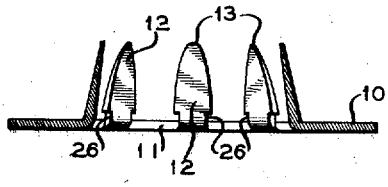
Figure 11:
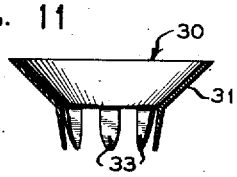
Figure 12:
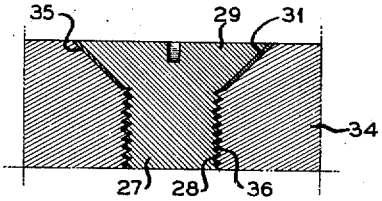
Figure 5:
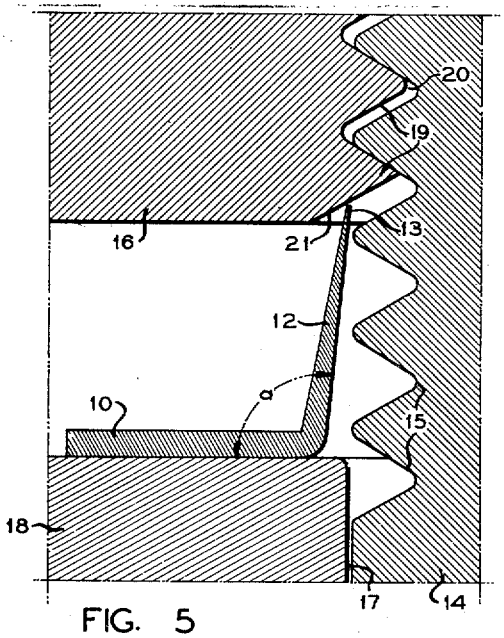
Figure 6:
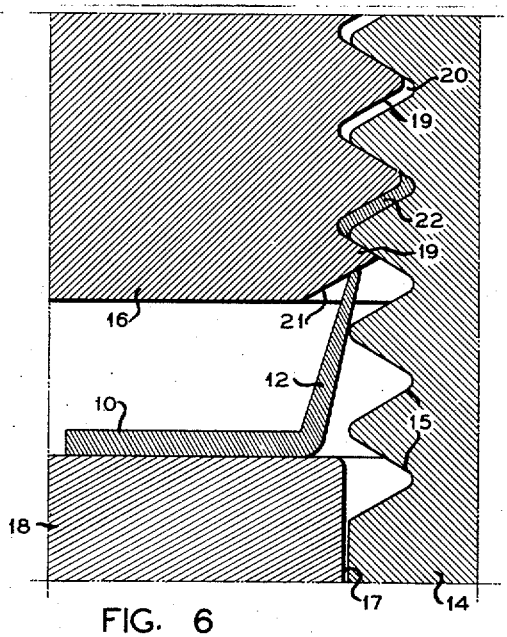
Figure 7:
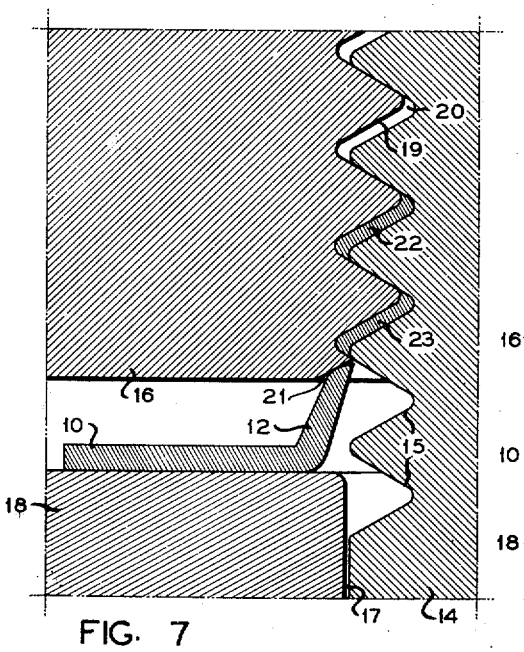
Figure 8:
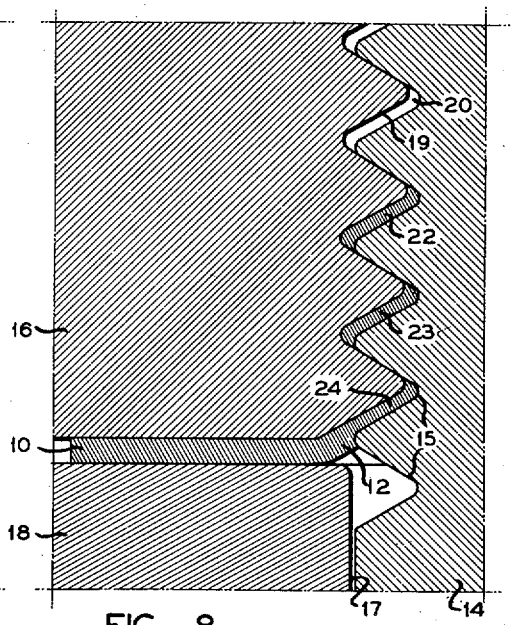

Further objects and advantages of the invention will be apparent from the following specification, taken in conjunction with the following drawings wherein:

Fig. 1 is a top plan view of a lock washer constructed in accordance with one embodiment of the invention;

Fig. 2, a horizontal sectional view through the lock washer, taken on the line 2—2 of Fig. 1;

Fig. 2, a partial sectional view illustrating a lock washer applied to a bolt, a nut being disclosed upon the bolt in position immediately prior to engagement with the washer;

Fig. 4, a view similar to Fig. 3, but illustrating the lock washer and nut in tightened or engaged positions;

Fig. 5, a fragmentary sectional view taken through bolt, nut and lock washer and illustrating, on a somewhat enlarged scale, the nut positioned at the moment of engagement with said washer;

Fig. 6, a fragmentary detail sectional view, similar to Fig. 5, but illustrating the nut advanced or tightened to a partially engaged position;

Fig. 7, a fragmentary detail sectional view, similar to Fig. 6, but illustrating the nut still farther advanced or tightened upon the bolt;

Fig. 8, a fragmentary detail sectional view, similar to Fig. 7, but illustrating the nut in completely engaged or tightened position;

Fig. 9, a fragmentary sectional view illustrating a slightly modified form of lock washer tongue;

Fig. 10, a fragmentary sectional view illustrating a still further modified form of lock washer tongue;

Fig. 11, a transverse sectional view through a lock washer constructed in accordance with the present invention and especially designed for use in connection with a machine or other screw, as distinguished from a bolt, and where no nut is required; and Fig. 12, a vertical sectional view illustrating the applicaiton of the lock washer disclosed in Fig. 11 upon a machine screw.

With continued reference to the drawings, there is disclosed in Fig. 1 a lock washer constructed in accordance with the present invention and comprising a relatively flat and thin annular member 10 having an inner circular periphery 11 provided with a plurality of integral and uniformly spaced, or evenly distributed, upstruck tongues 12. Any desired number tongues 12 may be provided, eight being illustrated for purposes of convenience only. Preferably the tongues 12 are bent upwardly from the plane of the member or washer proper 10 at an obtuse angle, illustrated at A in Fig. 5, which is within the limits of 91° to 105°, for a purpose to become more fully apparent hereinafter. It has been found in actual practice that the angular relationship of 95° between tongues and washer is desirable.

The tongues 12 preferably taper upwardly slightly, both in thickness and in width and are arcuate or rounded at their upper extremities as indicated at 13 and are completely spaced from each other, the meeting edge of each tongue with the inner periphery of the annular member 10 extending through an arc which is less than 60°. The lock washer of the instant invention is manufactured from a metallic material, such for example as iron or brass, which is substantially softer than the material of the nut and bolt to be locked thereby.

An application of the invention has been illustrated in Figures 3 through 8 where a bolt 14, externally threaded as at 15 for engagement with a suitable nut 16, is positioned within an aperture 17 in a base plate or the like 18. The bolt and nut are of standard or conventional conformation, the nut being internally threaded as at 19, the clearance 20 between the threads 15 and 19 of the bolt and nut respectively being illustrated on a somewhat enlarged or exaggerated scale, for the purposes of convenience. As disclosed more particularly in Figures 5 and 8, this clearance 20 *normally* assumes or provides a [spiral] *helical clearance* space between the *relatively unstressed* upper face of the threads 15 of the bolt 14 and the lower face of the threads 19 of the nut 16 when the nut is drawn up or tightened upon the bolt.

There is illustrated in Figs. 3 and 5 the relative position of bolt, nut and lock washer prior to the engaging or tightening operation. The washer 10 is placed upon the bolt 14, between the base member 18 and the nut 16, with the tongues 12 extending upwardly or toward the nut. These tongues incline inwardly, toward each other, the upper extremities 13 of opposed tongues preferably being spaced apart a distance slightly greater than the diameter of the threaded portion 15 of the bolt 14 so that the tongues are in no wise expanded or distorted when the lock washer is positioned upon the bolt. In conventional or standard nuts, the lowermost extremity of the internal threads thereof is customarily beveled, as indicated at 21, and the tongues 12 are preferably so dimensioned, with respect to the bolt and nut in connection with which the lock washer is employed, that the upper extremities 13 of the tongues are within the confines of this beveled portion 21, as indicated more particularly in Fig. 5 of the drawings. However, while this disposition is preferable it is by no means essential.

When the nut 16 is then turned downwardly or tightened upon the bolt 14, the tongues 12 will be forced downwardly and inwardly, at the same time maintaining substantially straight form. As the tightening operation continues, the lower edge of a thread 19 of the nut will engage the upper portion or extremity 13 of a tongue 12 and this upper portion will be forced between the threads 19 and 15, of nut and bolt, respectively, and will be formed in a somewhat plastic manner to accommodate or complement the clearance 20 as indicated more particularly at 22 in Fig. 6 of the drawings. As the tightening operation continues, this upper portion of the tongue will be completely severed. Continued or further tightening or rotation of the nut 16 will successively sever the upper portions of the tongues 12. On completion of a single revolution of the nut, the thread end thereof will again engage the upper extremity of the first mentioned tongue 12 and a portion thereof will be forced into a clearance 20, as illustrated more particularly in Fig. 8 of the drawings.

In this manner a plurality of portions 22, 23, and 24 of each tongue 12 are successively forced into the spiral clearance 20, thereby creating a high frictional resistance so that a correspondingly great torque is required to loosen the nut.

The threads of the nut and bolt are in no wise damaged by reason of the comparatively softer material from which the lock washer is manufactured, and no special conformation of either nut or bolt is required to obtain secure locking action. In fact, the lock washer of the instant invention will function in the identical efficient manner with especially designed nuts and bolts as with those of standard manufacture.

It will be readily apparent that the major function of the annular member 10 is to sustain the tongues 12 against the radial forces exerted when the tongues are successively bent down and the upper extremities thereof are forced into the clearance between the threads of the nut and bolt and are successively severed. It is considered essential that the tongues be individually spaced from the annular member 10 to insure that they are bent downwardly around an axis coinciding with the inner periphery of said annular member and that they do not become folded or bent in the direction of the length thereof. Further, after the nut has been drawn to final engaged position, as indicated in Figs. 4 and 8 of the drawings, the annular member 10 performs no locking function, the frictional resistance of the tongue portions 22, 23, and 24 forced into and deformed within the thread clearance 20 being relied upon to prevent unintentional or accidental loosening of the nut 16.

Preferably each tongue 12 is of greater height than width, it having been found in practice that a tongue height equal to three times the pitch of the thread of the machine element with which the lock washer is engaged provides highly satisfactory results. It will be understood, however, that this relationship between tongue height and width is not considered critical and may be varied, within reasonable limits, as desired.

In the modification of the lock washer illustrated in Fig. 9 of the drawings, a circumferential incision 25 is provided at each juncture of a tongue 12 with the annular base 10 to so weaken the structure whereby the lowermost portion of each tongue will be broken off when the nut is in tightened position. This will facilitate the disassembly of nut and bolt as there will be no part of the annular portion engaging the threads of the bolt and requiring the use of force or possibly tools to effect the removal thereof.

In the modification illustrated in Fig. 10 of the drawings, the base of each tongue 12 is provided with opposed lateral incisions 26. Such incisions are of particular value if the tongues 12 have a substantial circumferential extension and insure against any downward bending or collapsing of the tongues in the direction of the longitudinal axes thereof.

Upon the loosening or unscrewing of the nut, all locking action is lost since the washer, or at least the tongue or locking portions thereof, is substantially consumed during the tightening operation. It is therefore necessary to provide a new lock washer for each tightening of a nut upon a bolt. This is in direct contradiction to the vast majority of conventional lock washers, particularly those of resilient nature, where a mechanic may rely on the spring action thereof to permit repeated uses.

There has been illustrated in Figs. 11 and 12 of the drawings a lock washer constructed in accordance with the teachings of the present invention and especially designed for use in connection with a machine screw 27 screw-threaded as at 28 and provided with a frusto-conical head 29. The lock washer 30 includes an annular and frusto-conical portion 31, complementary to the head of the screw, and the inner periphery 32 thereof is provided with a plurality of integral and angularly inclined spaced tongues 33 similar in conformation and function to the tongues 12 of the lock washers described hereabove. The base plate or member 34 is counter-sunk as indicated at 35 and provided with a threaded aperture 36 and the annular portion of the lock washer is receivable between the lower surface of the frusto-conical head 29 of the screw and said counter-sunk portion. It is considered that no particular discussion of the operation of a lock washer of this character is required since it will function in an identical manner as when a nut and bolt are assembled with the lock washer of the present invention disposed therebetween. Successive portions of the tongues 33 will be forced between the threads of aperture and screw and will be deformed therebetween and severed to provide frictional resistance that will prevent accidental or vibratory loosening of the screw.

There has thus been described a lock washer of novel conformation which may be economically manufactured, which will function with a maximum degree of efficiency with nuts, bolts, screws, or the like, of standard of special manufacture, and which will effectively lock together the mechanical elements in connection with which it is utilized.

It will be obvious to those skilled in this art that various changes may be made in the invention without departing from the spirit and scope thereof and therefore the invention is not considered limited by that which is illustrated in the drawings and described in the specification but only as indicated in the accompanying claims.

What is claimed is:

1. In a fastening means in which an externally threaded bolt is adapted to be threadedly engaged with a complementarily internally threaded nut with a locking member positioned therebetween in surrounding relationship with respect to said bolt, the improvement which comprises a lock washer having an annular base portion and a plurality of upstruck substantially straight spaced tongues extending angularly inwardly from the inner periphery of said base portion toward said nut, the upper extremities of opposed tongues being spaced apart a distance slightly greater than the diameter of the threaded portion of said bolt, said tongues tapering slightly inwardly toward the upper extremities thereof at an obtuse angle on the order of 91° to 105° from said base, each of said tongues being of greater height than width and the base of each tongue extending through an arc of less than 60°, the material from which said tongues are formed being softer than the material forming the threads of said nut and bolt, a portion of each of said tongues being adapted to be forced between said threads and successively severed upon each revolution of the nut when said nut and bolt are engaged with each other.

2. In a fastening means in which an externally threaded bolt is adapted to be threadedly engaged with a complementarily internally threaded nut with a locking member positioned therebetween in surrounding relationship with respect to said bolt, the improvement which comprises a lock washer having an annular base portion and a plurality of integral upstruck substantially straight tongues extending angularly inwardly from the inner periphery of said base portion toward said nut, the upper extremities of opposed tongues being spaced apart a distance slightly greater than the diameter of the threaded portion of said bolt, said tongues inclining inwardly slightly and being of greater height than width, the material from which said tongues are formed being softer than the material forming the threads of said nut and bolt, a portion of each of said tongues being adapted to be forced between said threads and successively severed upon each revolution of the nut when said nut and bolt are engaged with each other.

[3. A lock washer as set forth in claim 2 where each tongue is provided with a circumferential incision immediately adjacent the base thereof to facilitate severance of said tongues from said base when the nut is in extreme tightened position.]

[4. A lock washer as set forth in claim 2 where each tongue is provided with opposed lateral incisions immediately adjacent the base thereof to facilitate severance of said tongues from said base when the nut is in extreme tightened position.]

5. In a fastening means in which an externally threaded member is adapted to be threadedly engaged with a complementarily internally threaded member with a locking member positioned therebetween in surrounding relationship with respect to the externally threaded member, the improvement which comprises a lock washer having an annular base portion and a plurality of upstruck substantially straight spaced tongues extending angularly inwardly from the inner periphery of said base portion toward the internally threaded member, the free extremities of opposed tongues being spaced apart a distance slightly greater than the diameter of the member upon which said lock washer is positioned, said tongues tapering inwardly slightly, the material from which said tongues are formed being softer than the material forming the threads of said members, a portion of said tongues being adapted to be forced between the threads of said members and successively severed upon each rotation of one of the members when said members are engaged with each other.

6. In a fastening means in which an externally threaded machine screw having a frusto-conical head is adapted to be threadedly engaged with a complementarily internally threaded member with a locking member positioned therebetween in surrounding relationship with respect to said machine screw, said internally threaded member being provided with a conical seat complementary to the head of the machine screw, the improvement which comprises a lock washer having a frusto-conical base portion and a plurality of integral substantially straight spaced tongues extending angularly inwardly from the inner periphery of said base portion toward the internally threaded member, the free extremities of opposed tongues being spaced apart a distance slightly greater than the diameter of said machine screw, said tongues tapering inwardly slightly, the material from which said tongues are formed being softer than the material forming the threads of said machine screw and internally threaded member, a portion of said tongues being adapted to be forced between the threads of said machine screw and said internally threaded member and successively severed upon each revolution of said machine screw when said machine screw and internally threaded member are engaged with each other.

*7. In a fastening means in which an externally threaded bolt is adapted to be threadedly engaged with a complementarily internally threaded nut with a locking member positioned therebetween in surrounding relationship with respect to said bolt, the improvement which comprises a lock washer having an annular base portion and a plurality of upstruck substantially straight spaced tongues extending angularly inwardly from the inner periphery of said base portion and tapering slightly inwardly toward the upper extremities thereof at an obtuse angle on the order of 91° to 105° from said base, each of said tongues being of greater height than width and the base of each tongue extending through an arc of less than 60°, said lock washer being adapted for positioning on the bolt with the upper extremities of its tongues in close proximity to the threaded portion of a bolt so as to be engaged by the lowermost extremity of a nut thread as the nut is screwed down on the bolt, and the material from which said tongues are formed being capable of severence by converging threads on the nut and bolt whereby a portion of each of said tongues is adapted to be forced between said threads and successively severed upon each successive revolution of the nut on the bolt.*

*8. In a fastening means in which an externally threaded bolt is adapted to be threadedly engaged with a complementarily internally threaded nut with a locking member positioned therebetween in surrounding relationship with respect to said bolt, the improvement which comprises a lock washer having an annular base portion and a plurality of integral upstruck substantially straight tongues extending angularly inwardly from the inner periphery of said base portion and inclining inwardly slightly and being of greater height than width, said lock washer being adapted for positioning on the bolt with the upper extremities of its tongues in close proximity to the threaded portion of the bolt so as to be engaged by the lowermost extremity of the nut thread as the nut is screwed down on the bolt, and the material from which said tongues are formed being capable of severance by converging threads on the nut and bolt whereby a portion of each of said tongues is adapted to be forced between said threads and successively severed upon each successive revolution of the nut on the bolt.*

*9. A lock washer as set forth in claim 8 where each tongue is provided with a circumferential incision immediately adjacent the base thereof to facilitate severence of said tongues from said base when the nut is in extreme tightened position.*

*10. A lock washer as set forth in claim 8 where each tongue is provided with opposed lateral incisions immediately adjacent the base thereof to facilitate severance of said tongues from said base when the nut is in extreme tightened position.*

*11. In a fastening means in which an externally threaded member is adapted to be threadedly engaged with a complementarily internally threaded member with a locking member positioned therebetween in surrounding relationship with respect to the externally threaded member, the improvement which comprises a base member having a hole through which the externally threaded member is adapted to extend, having a plurality of upstruck substantially straight spaced tongues extending angularly upwardly and inwardly from said base member, and said tongues tapering inwardly slightly, said base member being adapted for positioning on the externally threaded member with the upper extremities of its tongues in close proximity to the threaded portion of the externally threaded member so as to be engaged by the lowermost extremity of the internally threaded member as the internally threaded member is screwed down on the externally threaded member, and the material from which said tongues are formed being capable of severance by converging threads on the nut and bolt whereby a portion of said tongues is adapted to be forced between the threads of said members and successively severed upon each successive rotation of one of the threaded members relative to the other.*

References Cited in the file of this patent or the original patent

UNITED STATES PATENTS

| Number | Name | Date |
|---|---|---|
| 406,150 | Scott | July 2, 1889 |
| 527,569 | Weisell | Oct. 16, 1894 |
| 2,001,290 | Thompson | May 14, 1935 |